United States Patent
Ohno et al.

(10) Patent No.: US 7,059,642 B2
(45) Date of Patent: Jun. 13, 2006

(54) VEHICLE BUMPER STRUCTURE

(75) Inventors: Yoshikazu Ohno, Okazaki (JP); Akiyoshi Nagae, Toyota (JP); Takao Itoh, Nishikamogun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 17 days.

(21) Appl. No.: 10/887,815

(22) Filed: Jul. 12, 2004

(65) Prior Publication Data

US 2005/0046206 A1 Mar. 3, 2005

(30) Foreign Application Priority Data

Jul. 31, 2003 (JP) .............................. 2003-283602

(51) Int. Cl.
*B60R 19/18* (2006.01)
(52) U.S. Cl. ........................................ 293/120; 293/121
(58) Field of Classification Search ................ 296/102, 296/120, 121, 132, 136
See application file for complete search history.

(56) References Cited

U.S. PATENT DOCUMENTS

| 4,652,032 | A  | * | 3/1987 | Smith ........................ 293/120 |
| 5,096,243 | A  | * | 3/1992 | Gembinski ................. 293/120 |
| 5,290,078 | A  | * | 3/1994 | Bayer et al. ................ 293/120 |
| 5,799,991 | A  |   | 9/1998 | Glance |
| 6,406,081 | B1 |   | 6/2002 | Mahfet et al. |
| 6,609,740 | B1 | * | 8/2003 | Evans ........................ 293/121 |
| 6,848,730 | B1 | * | 2/2005 | Evans ........................ 293/121 |
| 6,863,322 | B1 | * | 3/2005 | Hunter et al. ............... 293/120 |
| 6,877,785 | B1 | * | 4/2005 | Evans et al. ................ 293/120 |
| 2002/0149214 | A1 | * | 10/2002 | Evans ........................ 293/120 |
| 2003/0189344 | A1 | * | 10/2003 | Evans ........................ 293/120 |
| 2004/0017089 | A1 | * | 1/2004 | Hunter et al. ............... 293/120 |
| 2004/0056491 | A1 | * | 3/2004 | Murata et al. .............. 293/120 |
| 2004/0169381 | A1 | * | 9/2004 | Evans et al. ................ 293/121 |

FOREIGN PATENT DOCUMENTS

| JP | U 62-66854 | 4/1987 |
| JP | U 02-006661 | 1/1990 |
| JP | U 2-68247 | 5/1990 |
| JP | A 9-240393 | 9/1997 |
| JP | A 10/175485 | 6/1998 |
| JP | A 2000-1150 | 1/2000 |

* cited by examiner

*Primary Examiner*—Patricia L. Engle
(74) *Attorney, Agent, or Firm*—Oliff & Berridge, PLC

(57) ABSTRACT

An impact-absorbing system and method which assures speed dependency of loads generated in side members at times of frontal collisions, and reduces repair costs at times of low-speed collisions. A reinforcing member spans along a vehicle width direction in a substantially linear form between front ends of a pair of side members. A region of a rear wall portion of an impact-absorbing member, which region is disposed so as to connect between end portions of the side members, is provided with a plurality of protrusion portions which are spaced by a predetermined interval in the vehicle width direction, and includes grooves at outer peripheries of base portions of the protrusion portions. Peak portions of the protrusion portions include hole portions along a length axis of the vehicle.

11 Claims, 6 Drawing Sheets

VEHICLE BUMPER STRUCTURE

CROSS-REFERENCE TO RELATED APPLICATION

This application claims priority under 35 USC 119 from Japanese Patent Application No. 2003-283602, the disclosure of which is incorporated by reference herein.

BACKGROUND OF THE INVENTION

1. Field of the Invention

The present invention relates to a vehicle bumper structure, and particularly relates to a vehicle bumper structure for an automobile or the like which is provided with an energy-absorbing member.

2. Description of the Related Art

Secondary structures at bumper structures of vehicles such as automobiles and the like have been known heretofore. There is a structure in which left and right side members extend in a front-rear direction of a vehicle, a bumper reinforcement which extends in a vehicle width direction spans between front ends of the left and right side members, a bumper cover is provided forward of this bumper reinforcement, and an extension member is fixed at a front wall of the bumper reinforcement and extends close to a rear face of the bumper cover. Thus, directly after a collision, an impact load is transmitted from the bumper cover through the extension member to the bumper reinforcement, and is further transmitted to the left and right side members. (See, for example, Japanese Patent Application Laid-Open (JP-A) No. 2000-001150.)

However, with this vehicle bumper structure, when there is a frontal collision, a load that is generated is concentrated at a vehicle width direction central portion of the bumper reinforcement, and buckles the bumper reinforcement toward the rear of the vehicle. Consequently, loads in the left-right direction are generated at the front ends of the left and right side members. As a result, buckling modes of the left and right side members vary in accordance with the collision speed, and a speed dependency of loads generated in the side members is reduced. Therefore, if an acceleration sensor for operation of an airbag is provided at a rear end of a side member, that airbag cannot be operated in optimum conditions. Furthermore, because the extension member is made of metal, costs for repairing an extension member when it has been deformed by a low-speed collision are high.

SUMMARY OF THE INVENTION

In consideration of the circumstances described above, provision of a vehicle bumper structure which assures speed dependency of a load that is generated in a side member at a time of frontal collision and which can reduce costs of repair when there is a low-speed collision is required.

One aspect of the present invention is a bumper absorber which is provided with a rear wall portion and with a plurality of protrusion portions which are arranged in a vehicle width direction of the rear wall portion. Lengths along a vehicle front-rear direction of at least some of this plurality of protrusion portions gradually get shorter toward outer sides in the vehicle width direction.

A vehicle bumper structure of another aspect of the present invention includes a bumper reinforcement which extends in the vehicle width direction and spans between front ends of left and right side members, which extend in the vehicle front-rear direction, and a bumper absorber which is disposed between the bumper reinforcement and a bumper cover. Further, a plurality of protrusion portions are provided at a region of this bumper absorber that oppose the bumper reinforcement, and grooves are provided at outer peripheries of base portions of the protrusion portions of the bumper absorber.

Hence, when the bumper cover frontally collides with a colliding body, a load is transmitted from the bumper cover through the bumper absorber to the bumper reinforcement, and is further transmitted to the side members. At this time, the collision load can be transmitted through the bumper reinforcement to the side members, directly after the collision, by the plurality of protrusion portions which are provided standing from the region of the bumper absorber that opposes the bumper reinforcement. Further, the protrusion portions at a vehicle width direction central portion of the bumper absorber, which protrude in a vehicle forward direction more than the protrusion portions at vehicle width direction outer side regions, are subjected to pressure sooner and, because of the grooves that are formed at the base portion outer peripheries of the protrusion portions, the protrusion portions consistently deform without affecting surrounding regions. As a result, a concentration of the load that is generated at the time of frontal collision at the vehicle width direction central portion of the bumper is prevented. Consequently, the generation of left-right direction loads at the front ends of the left and right side members can be prevented, and thus the speed dependency of loads that are generated in the left and right side members at times of frontal collisions is excellent. Furthermore, because the concentration of a load that is generated at a time of frontal collision at the vehicle width direction central portion of the bumper absorber can be prevented, deformation of the vehicle width direction central portion of the bumper reinforcement toward a vehicle length direction inner side at a time of low-speed collision can be prevented. Consequently, costs of repair when there is a low-speed collision can be reduced.

In the vehicle bumper structure of the present invention described above, peak portions of the protrusion portions may include hole portions and a region of the bumper absorber that opposes the bumper cover may include a plurality of recess portions, such that the holes and the recess portions are on coincident axes in the vehicle front-rear direction.

In such a case, because the recess portions at the bumper cover side of the bumper absorber and the hole portions at the peak portions of the protrusion portions at the bumper reinforcement side of the bumper absorber are coaxial in the vehicle front-rear direction, a load that is applied at the bumper cover side of the bumper absorber can be effectively transmitted through outer peripheral portions of the recess portions and the peak portions of the protrusion portions to the bumper reinforcement. Resultantly, it is possible, by adjusting shapes of the recess portions and the protrusion portions, to reliably implement control of applied loads.

A vehicle bumper structure of the present invention includes: the bumper reinforcement extending in the vehicle width direction, which spans between the front ends of the left and right side members which extend in the vehicle front-rear direction; the bumper absorber, which is disposed between the bumper reinforcement and the bumper cover; the plurality of protrusion portions disposed at the region of the bumper absorber that opposes the bumper reinforcement; and the grooves which are formed at the outer peripheries of the base portions of the protrusion portions of the bumper absorber. Consequently, the vehicle bumper structure has excellent effects in that the speed dependency at the side members of loads generated at times of frontal collisions is excellent, and in that the cost of repair when there is a low-speed collision can be reduced.

When, in the vehicle bumper structure of the present invention, the peak portions of the protrusion portions include the hole portions, the region of the bumper absorber that opposes the bumper cover includes the plurality of recess portions, and the holes and the recess portions are on coincident axes in the vehicle front-rear direction, the vehicle bumper structure has an excellent effect in that control of applied loads can be implemented consistently.

DETAILED DESCRIPTION OF THE INVENTION

Figure 1:
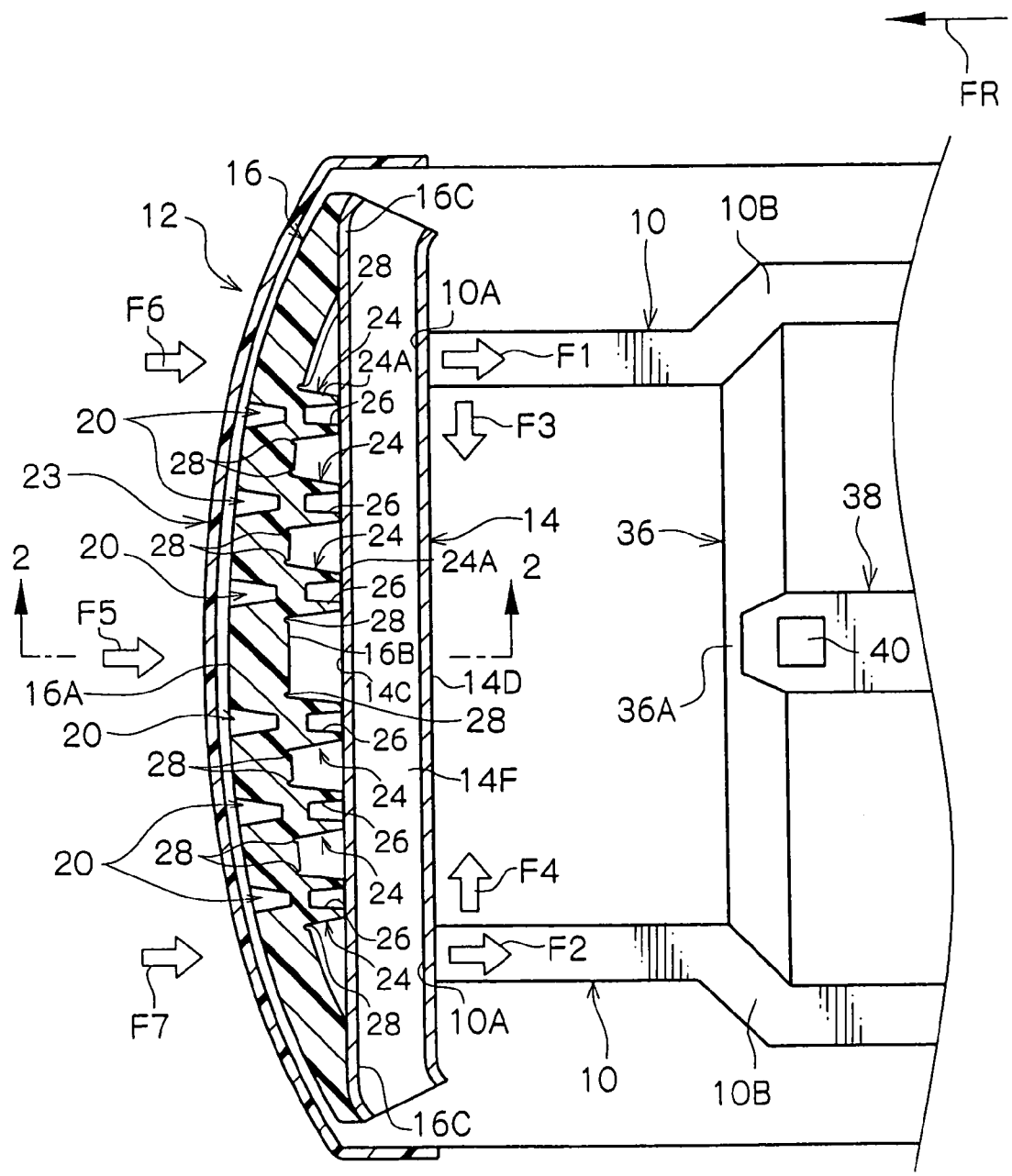
FIG. 1 is a sectional plan view showing a vehicle bumper structure relating to one embodiment of the present invention.

An embodiment of the vehicle bumper structure of the present invention will be described in accordance with FIGS. 1 to 3.

Here, the arrow FR in the drawings indicates a vehicle forward direction, the arrow UP indicates a vehicle upward direction, and the arrow IN indicates a vehicle inner side direction.

As shown in FIG. 1, a front bumper 12 is provided with a bumper cover 23 (a vehicle lateral direction member). A bumper absorber 16 (a first member at an inner side of the vehicle lateral direction member) is at an inner side of the bumper cover 23. A bumper reinforcement 14 (a second member at an inner side of the first member) is provided extending in a substantially linear form along a width direction of the vehicle. In the present embodiment, the bumper reinforcement 14 of the front bumper 12 is provided to span between front ends 10A of left and right front side members 10 (i.e., at least one pair of side members attached to the second member and running along a longitudinal direction of the vehicle), which extend in a front-rear direction of the vehicle.

Figure 2:
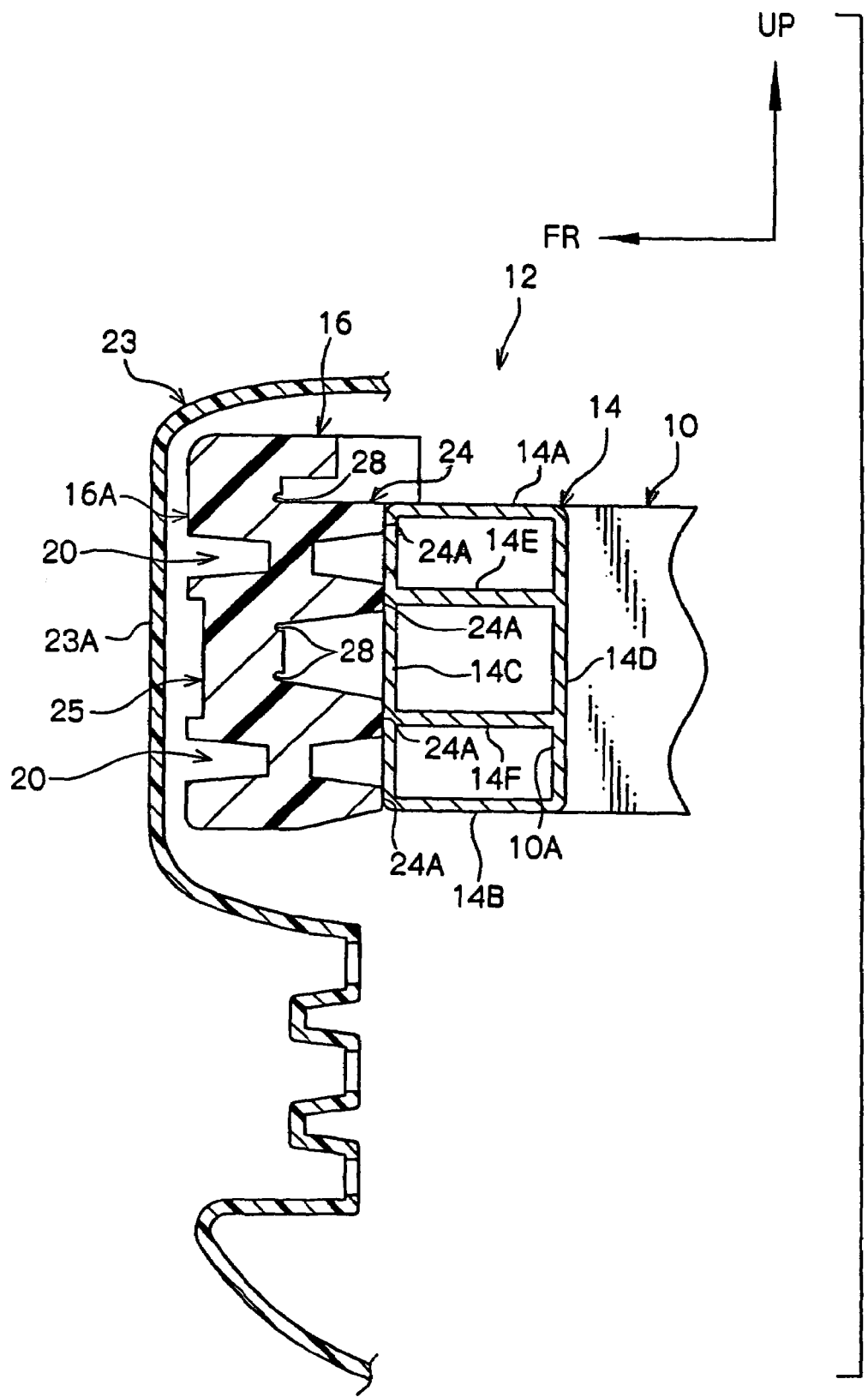
FIG. 2 is an enlarged sectional view cut along line 2—2 of FIG. 1.

As shown in FIG. 2, a cross-sectional form of the bumper reinforcement 14 cut in a direction intersecting the length direction of the bumper reinforcement 14, that is, viewed in the vehicle width direction, has a grid or grille form in which horizontal wall portions 14E and 14F, which are joined with a front wall portion 14C and a rear wall portion 14D between an upper wall portion 14A and a lower wall portion 14B, are formed to be parallel with the upper wall portion 14A.

At a region of the front wall portion 14C of the bumper reinforcement 14 at which it is anticipated that collisions will occur (i.e., a vehicle forward direction or vehicle longitudinal direction end portion), the bumper absorber 16 is provided along the vehicle width direction to serve as an energy-absorbing member, which is structured of a restorable or resilient material, such as a resin such as polypropylene with a low expansion ratio or the like, a rubber or the like.

As shown in FIG. 1, a form of a front wall portion 16A of the bumper absorber 16 as viewed from a vehicle vertical direction has a circular arc form which bulges in the vehicle forward direction, so as to increase a degree of freedom of design and so as to lengthen a front-rear length of the bumper absorber 16 and increase an energy absorption amount thereof.

At a region between the left and right front side members 10, a plurality of recess portions 20 are formed in the front wall portion 16A of the bumper absorber 16, from the vehicle forward side toward the vehicle rearward side. The recess portions 20 are formed with predetermined intervals therebetween in the vehicle width direction. Here, the recess portions 20 have truncated pyramid forms.

As shown in FIG. 2, the recess portions 20 are formed in two rows, one above and one below, with a predetermined spacing therebetween in the vehicle vertical direction. The front wall portion 16A of the bumper absorber 16 in which the recess portions 20 are formed opposes an upper portion 23A of the bumper cover 23 in the vehicle front-rear direction.

As shown in FIG. 1, at a region of a rear wall portion 16B of the bumper absorber 16 between the front side members 10, which region opposes the front wall portion 14C of the bumper reinforcement 14, a plurality of protrusion portions 24 are formed with predetermined intervals therebetween in the vehicle width direction. Lengths of the plurality of protrusion portions 24 along the vehicle front-rear direction gradually get shorter from a vehicle width direction central portion toward the vehicle width direction outer sides, in correspondence with a circular arc form of the rear wall portion 16B of the bumper absorber 16, which bulges toward the vehicle forward direction.

Figure 3:
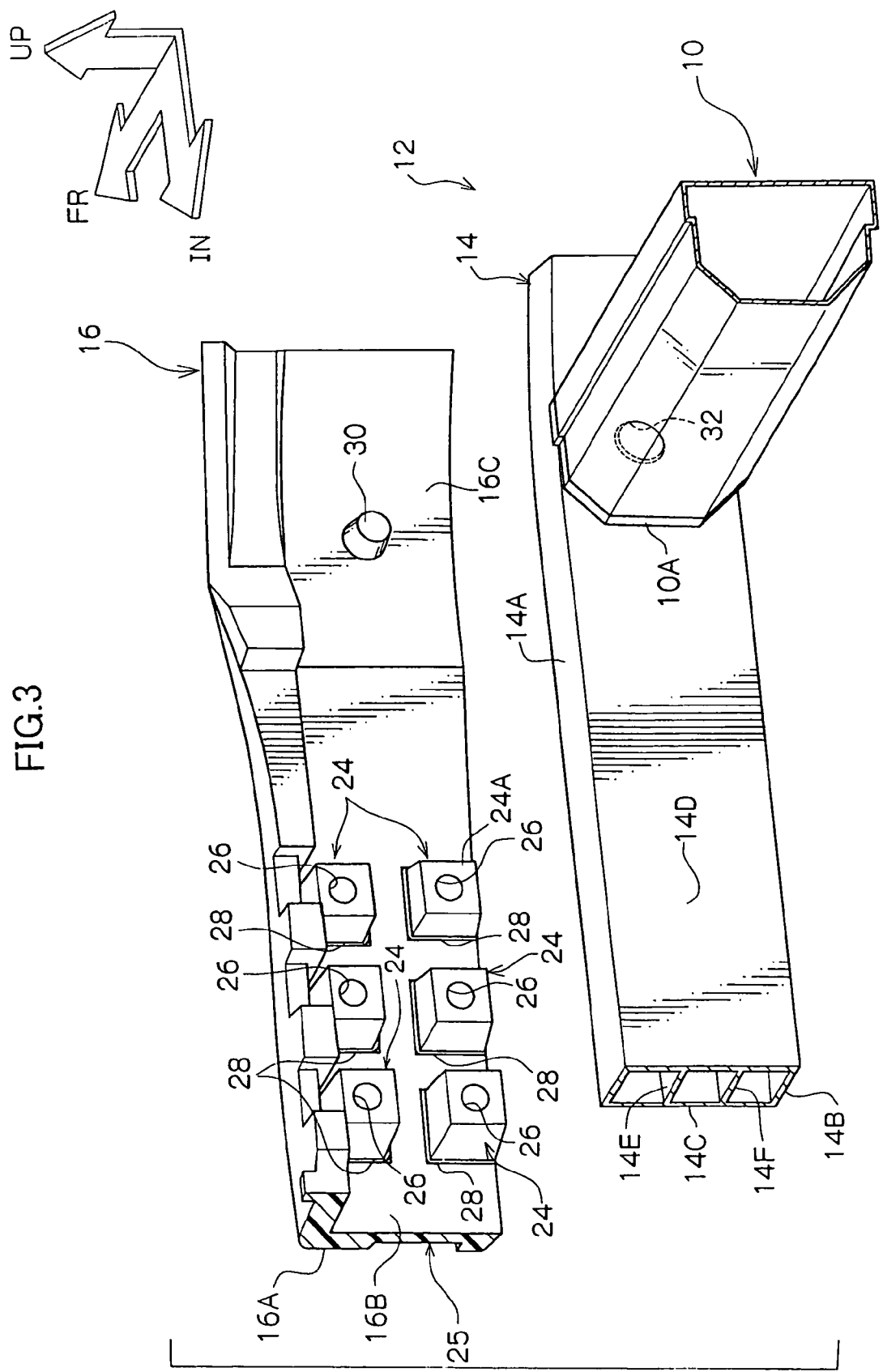
FIG. 3 is an exploded perspective view, viewed from a diagonally rearward inner side of the vehicle, showing the vehicle bumper structure relating to the one embodiment of the present invention.

As shown in FIG. 3, the plurality of protrusion portions 24 are formed in two rows, one above and one below, with a predetermined spacing therebetween in the vehicle vertical direction, and have truncated pyramid forms. Circular holes 26 are formed in peak portions 24A of the protrusion portions 24, from the vehicle rearward side toward the vehicle forward side. When the protrusion portions 24 are deformed by compression, the holes 26 will collapse. Thus, an energy absorption amount is increased, and a crushing residual is reduced. Further, grooves 28 are formed at outer peripheries of base portions of the protrusion portions 24. Thus, when the protrusion portions 24 are deformed, the protrusion portions 24 can reliably deform without affecting surrounding regions of the bumper absorber 16.

As shown in FIGS. 1 and 2, the recess portions 20 and the holes 26 of the protrusion portions 24 that are formed at the bumper absorber 16 are on coincident axes in the vehicle front-rear direction, and the protrusion portions 24 are provided at the bumper absorber 16 in the vehicle rearward direction relative to respective outer peripheral portions of the recess portions 20.

As shown in FIG. 2, the peak portions 24A of the protrusion portions 24 abut against the front wall portion 14C of the bumper reinforcement 14 at locations forward, respectively, of the upper wall portion 14A, the lower wall portion 14B, the horizontal wall portion 14E and the horizontal wall portion 14F. Further, at a vertical direction central portion of the bumper absorber 16, a shallow recess portion 25 is formed along the vehicle width direction. It is possible to dispose a harness in the recess portion 25.

As shown in FIG. 3, a protrusion portion 30 for positioning is formed toward the vehicle rearward direction at a vicinity 16C of each vehicle width direction end portion of the rear wall portion 16B of the bumper absorber 16. This protrusion portion 30 is inserted into a positioning hole 32, which is formed at a vicinity of each vehicle width direction end portion of the front wall portion 14C of the bumper reinforcement 14.

As shown in FIG. 1, a cross-member 36 is provided spanning between kick portions 10B of the left and right front side members 10. A front end portion of a floor tunnel 38 is joined to a vehicle width direction central portion 36A of the cross-member 36. An airbag deployment control circuit 40 is provided at a front portion of the floor tunnel 38. An acceleration sensor, which constitutes collision detection means, is incorporated at the airbag deployment control circuit 40.

Next, operation of the present embodiment will be described.

In the present embodiment, when the bumper cover 23 frontally collides with a body, loads F5, F6 and F7, as shown in FIG. 1, are transmitted from the bumper cover 23 through the bumper absorber 16 to the bumper reinforcement 14, and are further transmitted to the front side members 10. At this time, because the plurality of protrusion portions 24 are formed at the region of the bumper absorber 16 that faces the bumper reinforcement 14, the collision loads can be transmitted through the bumper reinforcement 14 to the front side members 10 directly after the collision.

Further, with the vehicle structure shown in FIG. 1, in order for accelerations which are dependent on collision speeds of the vehicle to be reliably generated at the acceleration sensor which is incorporated in the airbag deployment control circuit 40, it is necessary that loads F1 and F2 which are generated in the left and right front side members 10 are dependent on the collision speeds.

Therefore, it is necessary that buckling of a vehicle width direction central portion of the bumper reinforcement 14 toward the vehicle rearward direction (to a vehicle longitudinal direction inner side) at the time of a frontal collision is avoided, and that the generation of loads F3 and F4 in vehicle width inner side directions at the front ends 10A of the left and right front side members 10 is avoided.

With the present embodiment, when the protrusion portions 24 at the vehicle width direction central portion of the bumper absorber 16, which in plan view protrudes in the vehicle forward direction in the circular arc form relative to the vehicle width direction outer side regions, are subjected to pressure early in a collision, the protrusion portions 24 are reliably deformed without affecting surrounding regions, because of the grooves 28 formed at the base portion outer peripheries of the protrusion portions 24. Further, the protrusion portions 24 are also reliably deformed by the holes 26 collapsing.

As a result, at a time of frontal collision, concentration of the generated load F5 at the vehicle width direction central portion of the front bumper 12 can be avoided. That is, at the time of frontal collision, the load F5 that is generated at the vehicle width direction central portion of the bumper reinforcement 14 can be made smaller relative to the loads F6 and F7 that are generated at the respective vehicle width direction end portions of the bumper reinforcement 14. Consequently, the vehicle width direction inward direction loads F3 and F4, which act on the left and right front side members 10, can be suppressed. Thus, a change in buckling modes of the left and right front side members 10 in accordance with collision speeds and a reduction in speed dependence of the loads F1 and F2 generated in the front side members 10 can be prevented. Therefore, the speed dependence of the loads F1 and F2 generated at times of frontal collision is excellent, and an airbag(s) can be operated in optimal conditions.

Furthermore, with the present embodiment, because concentration of a generated load at the vehicle width direction central portion of the bumper absorber 16 at a time of frontal collision can be avoided, deformation toward the vehicle rearward direction of the vehicle width direction central portion of the bumper reinforcement 14 when there is a low-speed collision can be avoided. Consequently, costs for repair at times of low-speed collisions can be lowered.

Further still, with the present embodiment, because the holes 26 formed in the peak portions 24A of the protrusion portions 24 of the bumper absorber 16 are on coinciding axes in the vehicle front-rear direction with the recess portions 20 of the bumper absorber 16, a load that is applied to the bumper absorber 16 from the bumper cover 23 is transmitted through the recess portions 20 and the protrusion portions 24 to the bumper reinforcement 14 effectively. As a result, it is possible, by adjusting shapes of the recess portions 20 and the protrusion portions 24, to reliably implement control of applied loads.

Further still, loads are transmitted from the protrusion portions 24 of the bumper absorber 16 to the upper wall portion 14A, the lower wall portion 14B and the horizontal wall portions 14E. In other words, loads of the protrusion portions 24 can disperse toward the upper wall portion 14A, the lower wall portion 14B and the horizontal wall portions 14E.

Figure 4:
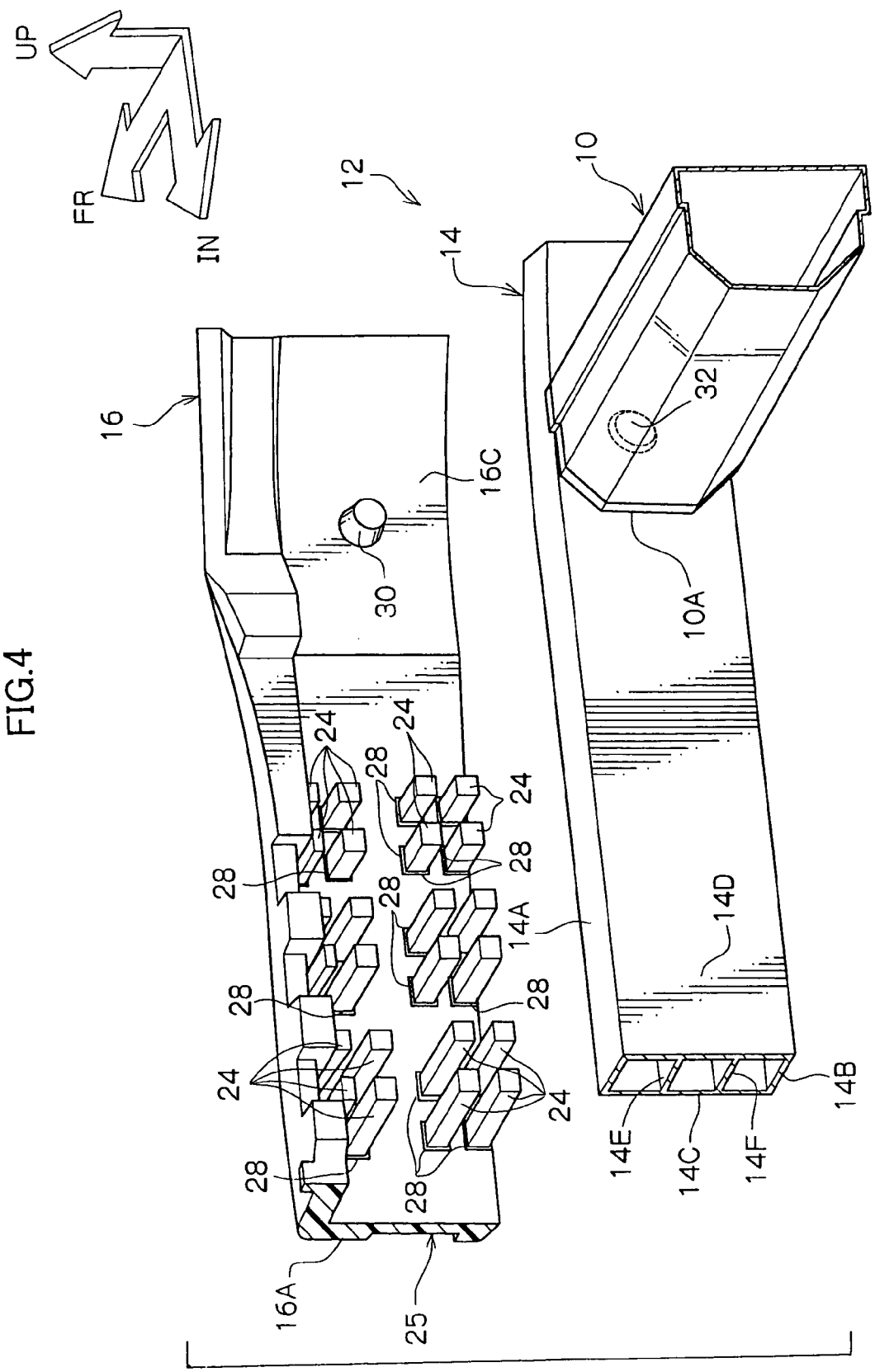
FIG. 4 is an exploded perspective view, viewed from the diagonally rearward inner side of the vehicle, showing a vehicle bumper structure relating to another embodiment of the present invention.
Figure 5:
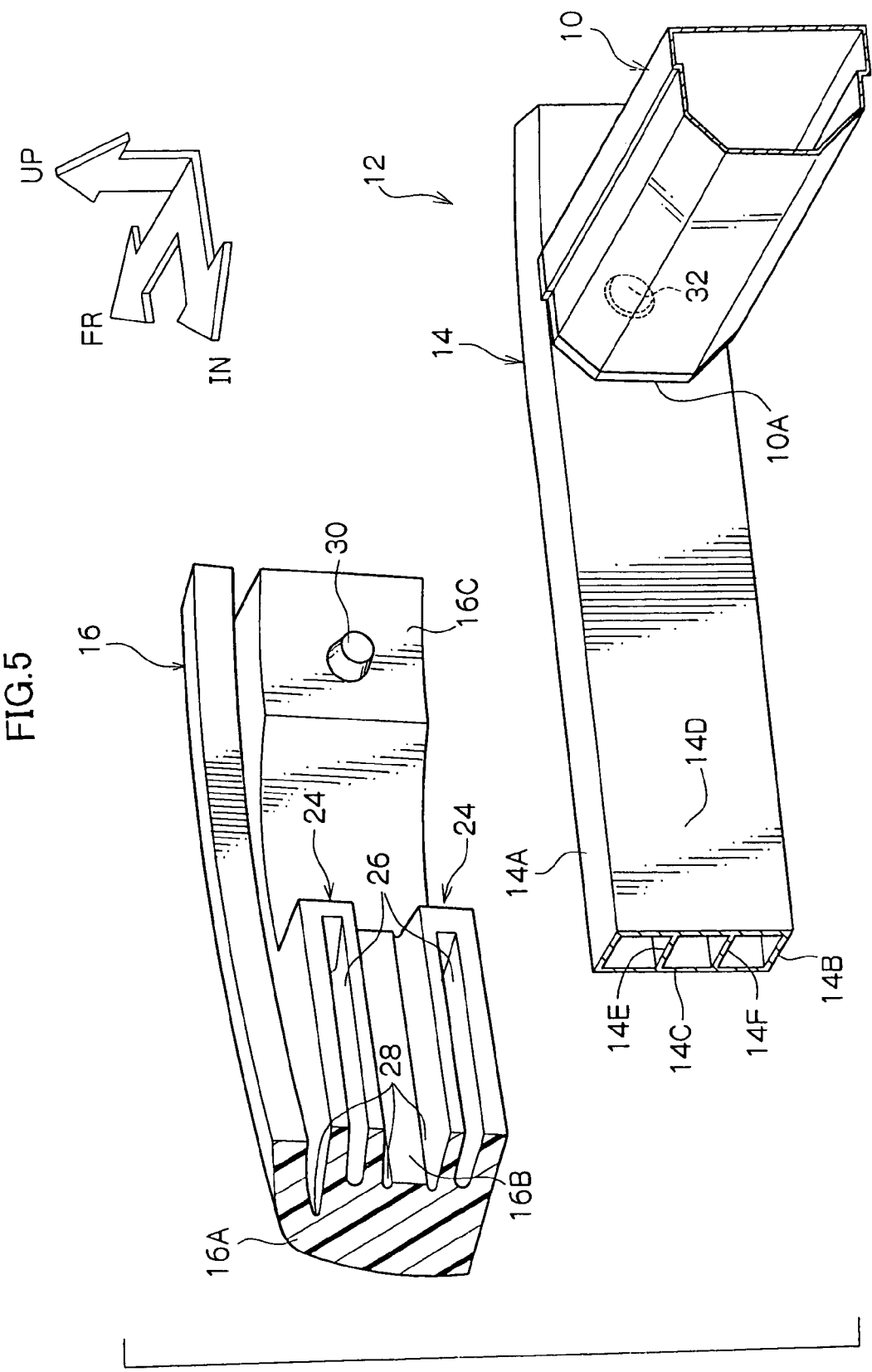
FIG. 5 is an exploded perspective view, viewed from the diagonally rearward inner side of the vehicle, showing a vehicle bumper structure relating to yet another embodiment of the present invention.

In the above descriptions, a particular embodiment of the present invention has been described in detail. However, the present invention is not limited to this embodiment, and it will be clear to persons skilled in the art that various other embodiments are possible within the scope of the present invention. For example, in the embodiment described above, the protrusion portions 24 have truncated pyramid shapes, and the holes 26 are formed in the peak portions 24A of the protrusion portions 24. However, instead of this, the protrusion portions 24 may be formed as thin columns (polygonal columns, circular columns or the like), as shown in FIG. 4. Further, as shown in FIG. 5, the protrusion portions 24 may be provided to extend along the vehicle width direction, and the holes 26 may be long holes whose length directions are in the vehicle width direction.

Figure 6:
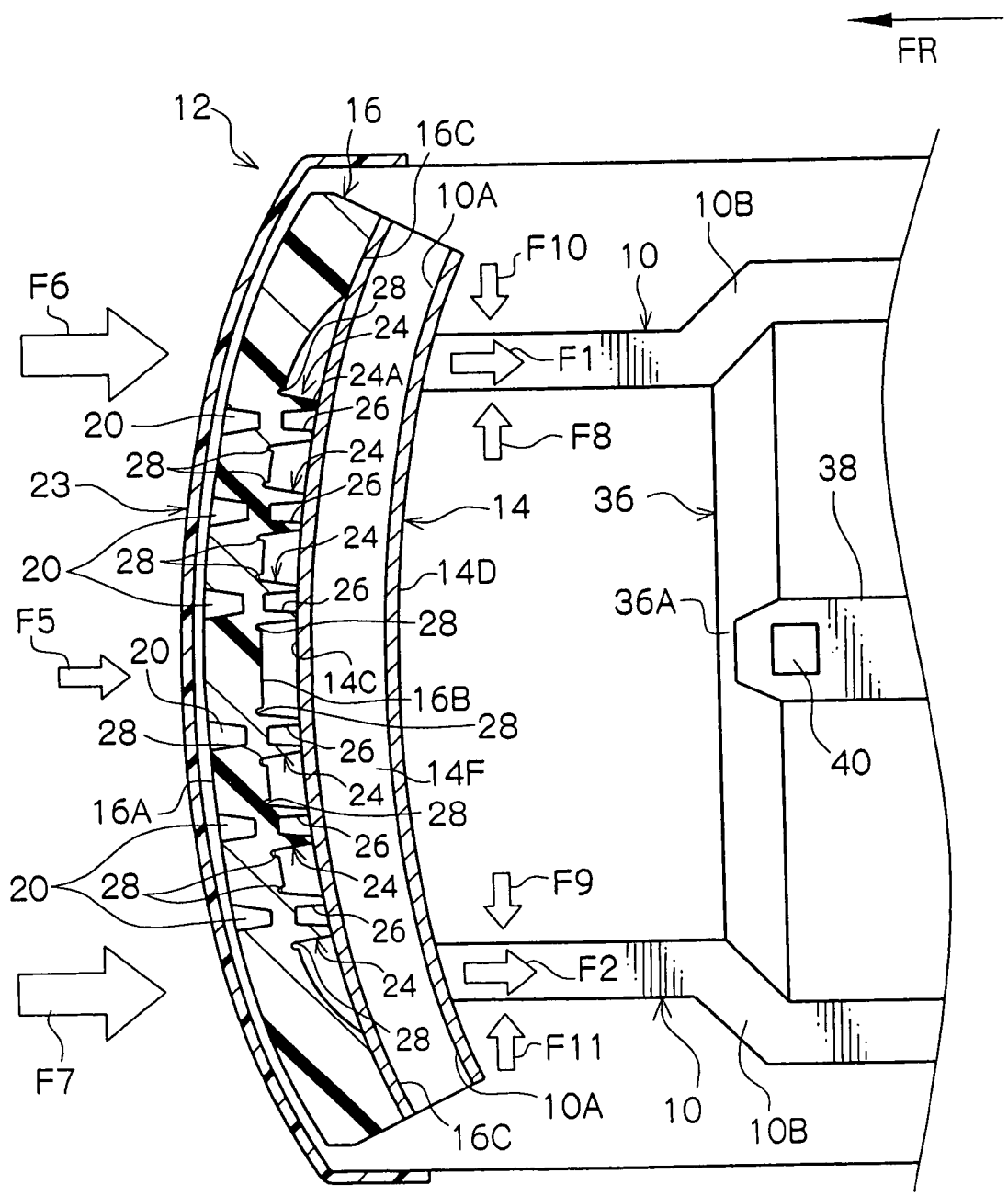
FIG. 6 is a sectional plan view showing the vehicle bumper structure relating to still another embodiment of the present invention.

Further again, a vehicle bumper structure of the present invention in which, as shown in FIG. 6, the bumper reinforcement 14 has a circular arc form which bulges toward the vehicle forward direction can also be applied to a vehicle. In such a case, loads F10 and F11 are generated. The loads F10 and F11 suppress loads F8 and F9, which act on the front ends 10A of the left and right front side members 10 at the time of a frontal collision so as to push the front ends 10A apart to the vehicle width direction outer sides thereof. Consequently, similarly to the embodiment described above, a reduction of the speed dependency of the loads F1 and F2 that are generated in the front side members 10 can be avoided. Moreover, costs of repair at times of low-speed collisions can be lowered.

Further yet, in the embodiment described earlier, the cross-sectional form of the bumper reinforcement 14 as viewed from the vehicle width direction has a grid or grille form. However, the cross-sectional form of the bumper reinforcement 14 as viewed from the vehicle width direction is not limited to the grid form.

Further still, in the embodiments described above, the vehicle bumper structure of the present invention is applied to a front bumper. In addition, the vehicle bumper structure of the present invention is also applicable to a rear bumper.

What is claimed is:

1. A bumper absorber comprising:
   a rear wall portion; and
   a plurality of protrusion portions arranged in a vehicle width direction of the rear wall portion, lengths along a vehicle front-rear direction of at least some of the plurality of protrusion portions gradually getting shorter toward a vehicle width direction outer side,
   wherein the protrusion portions comprise peak portions which include hole portions, a region of the bumper absorber that opposes a bumper cover includes a plurality of recess portions, and the hole portions and the recess portions are disposed on coincident axes in the vehicle front-rear direction.

2. A vehicle bumper structure comprising:
   a bumper reinforcement extending in a vehicle width direction, which spans between front ends of left and right side members which extend in a vehicle front-rear direction;
   a bumper cover;
   a bumper absorber which is disposed between the bumper reinforcement and the bumper cover; and
   a plurality of protrusion portions which are provided at a region of the bumper absorber that opposes the bumper reinforcement,
   wherein the protrusion portions of the bumper absorber include groove portions at outer peripheries of base portions of the protrusion portions.

3. The vehicle bumper structure of claim 2, wherein the protrusion portions comprise peak portions which include hole portions,
   a region of the bumper absorber that opposes a bumper cover includes a plurality of recess portions, and
   the hole portions and the recess portions are disposed on coincident axes in the vehicle front-rear direction.

4. The vehicle bumper structure of claim 2, wherein the bumper reinforcement comprises an upper wall portion, a lower wall portion and a horizontal wall portion, and at least one of the plurality of protrusion portions of the bumper absorber opposes front sides of the upper wall portion, the lower wall portion and the horizontal wall portion.

5. The vehicle bumper structure of claim 2, wherein the bumper absorber is disposed between a bumper reinforcement and a bumper cover, the bumper reinforcement spans between front ends of left and right side members in the vehicle front-rear direction and extends in the vehicle width direction, the plurality of protrusion portions is provided at a region of the bumper absorber that opposes the bumper reinforcement, and groove portions are provided at outer peripheries of base portions of the at least some of the plurality of protrusion portions.

6. An impact-absorbing system for collisions in a longitudinal direction of a vehicle, the vehicle comprising:
   a lateral direction member along a lateral direction of the vehicle;
   a first member along the lateral direction member at an inner side thereof;
   a second member along the first member at an inner side thereof; and
   at least one pair of side members along the longitudinal direction of the vehicle, which are attached to the second member,
   and the impact-absorbing system comprising:
      means for rapidly transmitting a load which is generated by a collision in the longitudinal direction of the vehicle to the side members;
      means for preventing buckling of the second member toward an inner side in the longitudinal direction of the vehicle; and
      means for preventing generation of loads in the lateral direction of the vehicle at end portions of the side members that are adjacent to the second member.

7. The system of claim 6, further comprising means for preventing concentration of the load generated by the vehicle longitudinal direction collision at a central portion in the lateral direction of the vehicle.

8. The system of claim 7, further comprising means for assuring speed dependency of axis direction loads which are generated in the side members.

9. An impact-absorbing method for collisions in a longitudinal direction of a vehicle which includes: a lateral direction member along a lateral direction of the vehicle; a first member along the lateral direction member at an inner side thereof; a second member along the first member at an inner side thereof; and at least one pair of side members along the longitudinal direction of the vehicle, which are attached to the second member, the impact-absorbing method comprising:
   rapidly transmitting a load which is generated by a collision in the longitudinal direction of the vehicle to the side members;
   preventing buckling of the second member toward an inner side in the longitudinal direction of the vehicle; and
   preventing generation of loads toward inner sides in the lateral direction of the vehicle at end portions of the side members that are adjacent to the second member.

10. The method of claim 9, further comprising preventing concentration of the load generated by the vehicle longitudinal direction collision at a central portion in the lateral direction of the vehicle.

11. The method of claim 10, further comprising assuring speed dependency of axis direction loads which are generated in the side members.

* * * * *